United States Patent

[11] 3,530,831

[72] Inventor William J. Conover
 Rhodes, Iowa 50234
[21] Appl. No. 768,975
[22] Filed Oct. 17, 1968
[45] Patented Sept. 29, 1970

[54] METHOD OF AND CLEANING APPARATUS FOR FARM ANIMAL FEEDING HOUSE
 14 Claims, 5 Drawing Figs.
[52] U.S. Cl.................................................. 119/16,
 119/22, 119/28
[51] Int. Cl..................................................... A01k 1/00
[50] Field of Search.......................................... 119/16, 28,
 22, 51

[56] References Cited
 UNITED STATES PATENTS
3,229,663  1/1966 Conover........................ 119/16
3,261,324  7/1966 Conover........................ 119/16
3,283,744  11/1966 Conover........................ 119/28X
3,292,582  12/1966 Rubricius...................... 119/22X Primary Examiner—Aldrich F. Medbery
Attorney—Henderson and Strom ABSTRACT: This invention relates to a method of and a cleaning apparatus for a farm animal feeding house which house includes a plurality of floors each sloped downwardly from the periphery toward the center, with each floor having a plurality of arcuately spaced stalls formed thereon and arranged concentrically about the center of the floor, and with the house having an auger type feed conveyor pivotally mounted at the center of the house for circularly swinging over the uppermost floor for dumping feed therefrom which reaches each floor, the improvement comprising a semi V-shaped trough formed about the inside of each floor, which trough progressively descends from one end to the other, the running of water to one or more nozzles above the top floor and trough for discharge thereon, with the water running down the uppermost floor onto the trough, and around and down that trough, and with means for carrying the cleansing water from one trough to another and then externally of the bin.

Patented Sept. 29, 1970

INVENTOR
WILLIAM J. CONOVER

BY
Henderson & Strom
ATTORNEYS

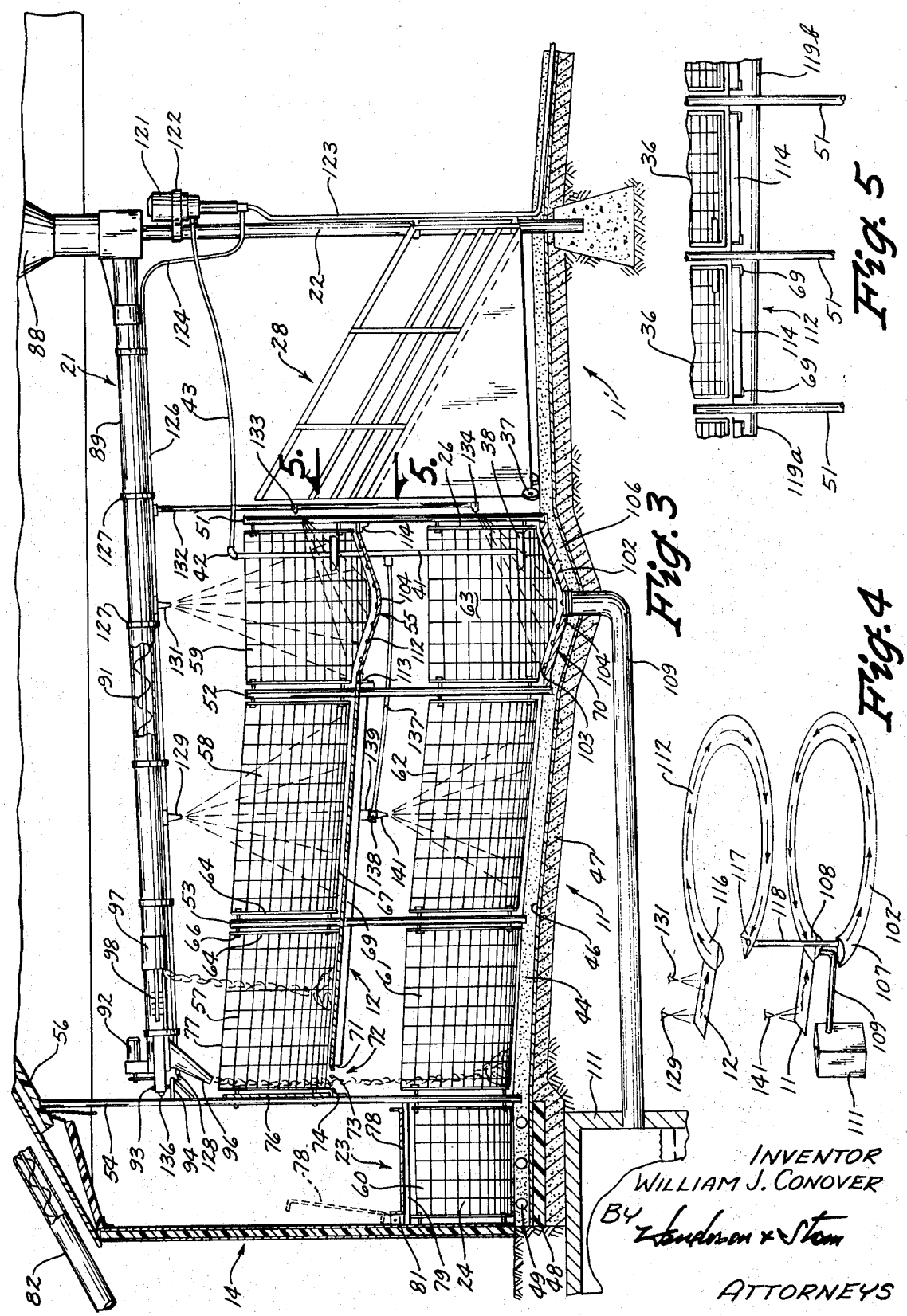

3,530,831

METHOD OF AND CLEANING APPARATUS FOR FARM ANIMAL FEEDING HOUSE

BACKGROUND OF THE INVENTION

This invention relates to the type of farm animal feeding house which is disclosed in U.S. Pat. No. 3,229,663. In the commercial application of the structure described in that patent, a major problem arose in removing the animal wastes from the annular sanitation trough formed in the ground floor of that structure, and the utility of which required the placement of grates on each floor thereabove through which the animal wastes fell, and the further utility of which required the provision of a material agitating device mounted in the trough, an example of which is shown in U.S. Pat. No. 3,235,232.

The improvement of the present invention goes toward an elimination of the expensive trough formed below the ground floor for receiving and maintaining the animal wastes in a liquid state for manageability thereof, an elimination of the rather expensive grates on each floor above the trough, and an elimination of the material agitating device for maintaining the animal wastes in a liquid condition.

SUMMARY OF THE INVENTION

This invention relates to the cleaning of floors of a circular type farm animal feeding house by providing a farm animal supporting pan having a slight V-shape in cross section around the inside of each floor, which floors are sloped inwardly toward each pan; by providing further one or more water sprinkling nozzles disposed above the uppermost floor and attached to a feed conveyor which swings circularly about the house and above the uppermost floor whereby water therefrom is discharged downwardly onto the uppermost floor running down over the surface of said floor and thereby cleaning same, with the water then running onto the pan of the uppermost floor.

The pan descends progressively from one end to the other such that the cleansing water also cleans the pan by running from the high side of said pan toward the low side; and the improvement comprising further a conduit arrangement for disposing of the fluid from each floor in a manner such that the cleansing fluid runs over the pan of each floor.

The improvement comprises further one or more sprinkling nozzles which are attached to the said conveyor for directing a cleansing fluid downwardly upon the pan of each floor; and also the provision of directing water onto each of the superimposed floors.

An object of this invention is to provide an improved farm animal feeding house.

Another object of this invention is to provide a new and novel cleaning arrangement for a farm animal feeding house for automatically cleaning the floors of the house of animal wastes.

It is another object of this invention to provide a cleaning arrangement for flushing away the animal wastes on the floors of an animal feeding house.

Yet another object of this invention is to provide a cleaning arrangement wherein the water used for flushing away the animal wastes is also usable for making the air cleaner and for cooling the animals.

Still another object of this invention is to provide a cleaning arrangement wherein the water used for cleaning and flushing the floors of the house is associated with an overhead feed conveyor means which swings circularly over the uppermost of the floors in said house.

It is another object of this invention to provide a novel and useful method of cleaning a farm animal feeding house having a plurality of superimposed floors, and wherein the cleaning effects an automatic flushing of all the floors, and further wherein the cleaning would be effective regardless of the circumferential shape of the floors.

Another object of this invention is to provide a cleaning arrangement capable of attaining the aforementioned objects, and which obviates the formation of methane and ammonia fumes caused by animal wastes left standing, and which eliminates further the formation of anaerobic bacteria from said wastes.

Yet another object of this invention is the provision of a cleaning arrangement for a farm animal feeding house which is economical of manufacture, simple but rugged in construction, and effective in use.

These objects and other features and advantages of this invention will become readily apparent upon reference to the following description when taken in conjunction with the accompanying drawings.

BRIEF DESCRIPTION OF THE DRAWINGS

FIG. 3 is an enlarged, fragmentary, vertical sectional view taken along the offset line 3–3 in FIG. 2;

FIG. 4 is a reduced, schematic view showing the flow of water over certain portions of the floors of the house; and FIG. 5 is a fragmentary, elevational view of a portion of the cleaning arrangement of this invention as taken along the line 5–5 in FIG. 3.

DESCRIPTION OF THE PREFERRED EMBODIMENT

Figure 1:
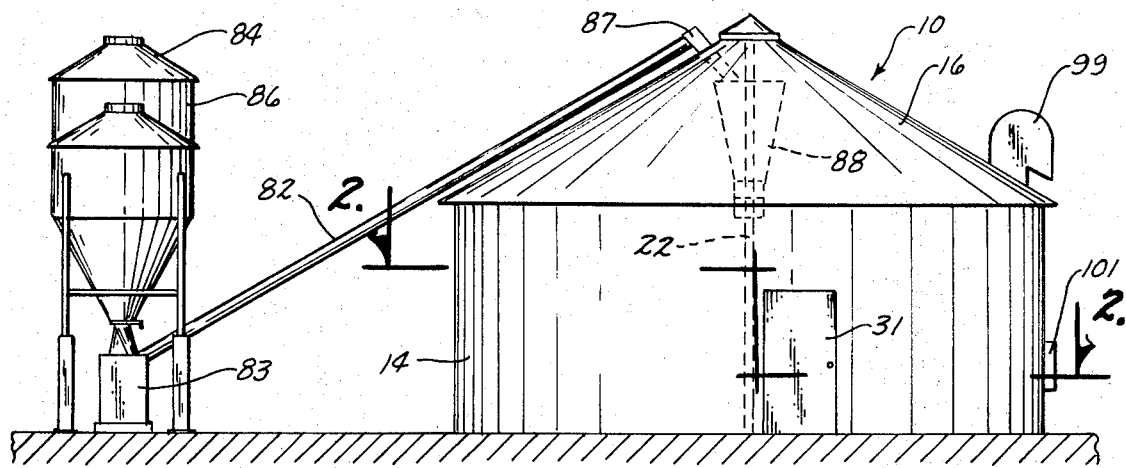
FIG. 1 is an elevational view of the circular feeding house within which this invention is assembled, the house shown in conjunction with a pair of bulk tanks.

Referring to the drawings, and particularly to FIG. 1, the farm animal feeding house which encloses this invention is indicated generally at 10 and includes basically a circular first floor 11 (FIG. 3) and a circular second or upper floor 12 disposed above the first floor 11. An upstanding circular wall 14 of corrugated steel sheet or the like is mounted on the periphery of the first floor 11, and a conical roof 16 is supported on the wall 14 for enclosing the feeding house 10.

Figure 2:
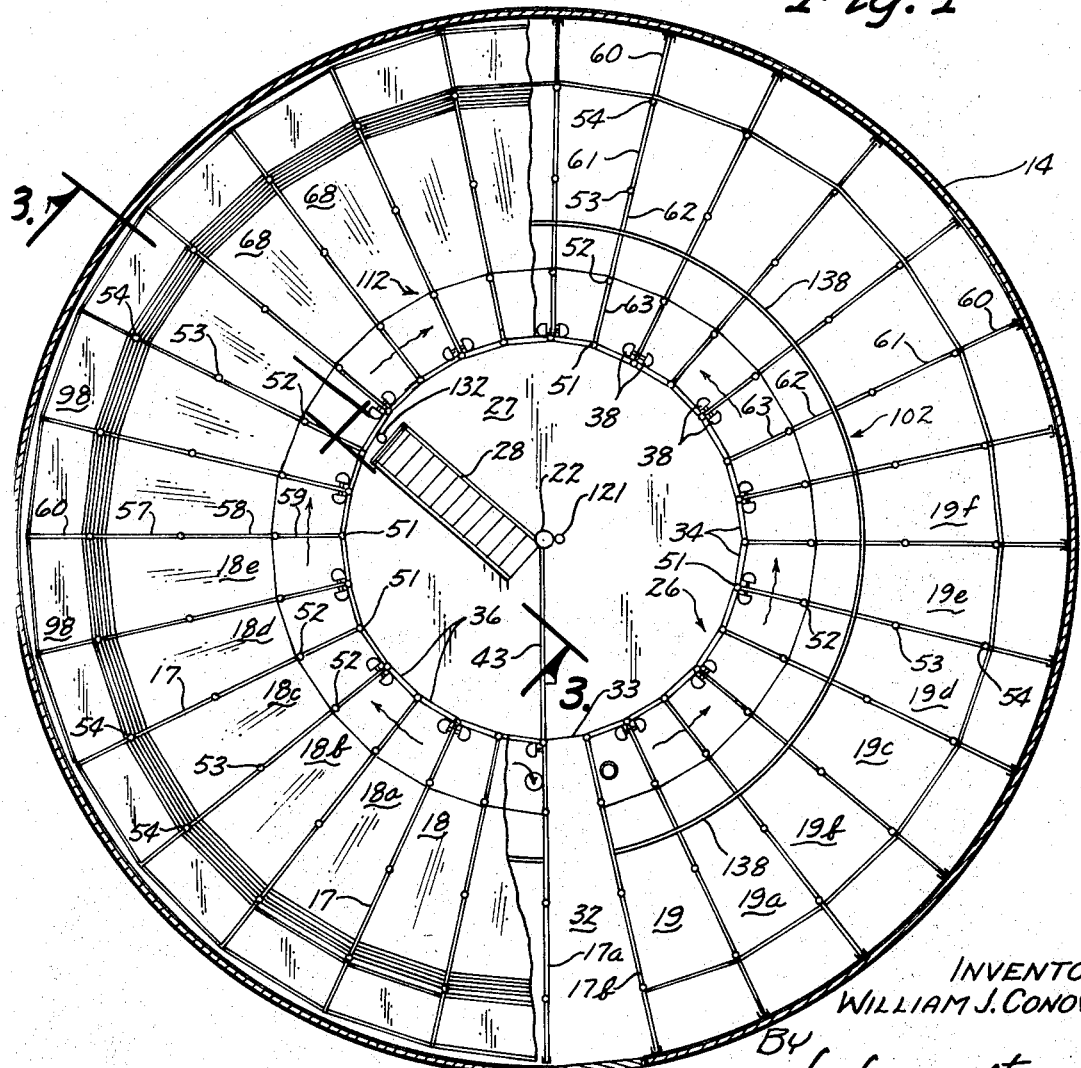
FIG. 2 is an enlarged sectional view taken along the offset line 2–2 in FIG. 1 and shows in fragmentary form a pair of superimposed floors in plan view.

Within the feeding house 10, a plurality of radial, arcuately spaced multistory partitions, indicated generally in FIG. 2 at 17 form a plurality of radial, pie-shaped stalls for the farm animals. The stalls on the second floor 12 are indicated at 18, 18a, 18b, 18c, etc. (FIG. 2), with the stalls formed on the first floor 11 being indicated at 19, 19a, 19b, 19c, etc. The second floor 12 is spaced sufficiently above the first floor 11 so that the sows and their offspring can easily maneuver between the two floors. Furthermore, the second floor 12 is spaced sufficiently below the upper edges of the partitions 17 so that the depth of the second floor stalls 18, etc., safely confine the sows therein.

Both floors 11 and 12 are provided with feed in a manner described in detail hereinafter by feed equipment indicated generally at 21 in FIG. 3, which equipment is mounted on and rotates about a centerpost 22 for the feeding house 10. To enable the operator to view both floors 11 and 12 simultaneously without changing his location, a catwalk assembly 23 (FIG. 3) is provided which cooperates with the circular wall 14 and partitions 17 to also cover a confinable area 24 therebelow for separating the offspring from the sows if necessary for safety purposes.

Referring to FIGS. 2 and 3, it is seen that the inner ends 26 of the stalls form a line concentric about the centerpost 22, forming thereby a center service area 27 within which a ramp 28 (FIG. 3) is mounted. Both the operator and the sows may enter the feeding house 10 through a door opening 31 in the wall 14, and through a passage 32 (FIG. 2) formed between a pair of arcuately adjacent partitions 17a and 17b. A gate 33 may be provided at the inner end of the passage 32 for confining swine within the center service area 27. Each lower stall 19, etc., is provided also with a swingable gate 34 for ingress and egress of the swine, with each upper stall 18, etc., also having like gates 36. The ramp 28 provides an inclined structure to move the animals from the service area 27 of the first floor 11 to the gate 36 at the inner end of any second floor stall 18, etc. The ramp gate 28 is rotatably secured to the centerpost 22 and is mounted on wheels 37 (FIG. 3) for rolling about the floor 11.

For the purpose of providing a continuous flow of water to each upper and lower stall, an automatic watering device 38 (FIG. 3) is mounted within each stall adjacent the inner end thereof. The devices 38 are mounted in pairs (See FIG. 2), each pair leading off a vertical pipe 41 affixed to one side of a partition and with all water pipes 41 connected at their upper ends to an overhead pipe 42. The pipe 42 is supplied water by a flexible conduit 43 (FIG. 3) emerging from the centerpost as described more in detail hereinafter. The devices 38 supply water automatically upon demand by any animal and are of a conventional nature.

The first floor 11 is shown in detail in FIG. 3 and comprises a layer of concrete 44 above a sheet 46 of polyethylene or the like above a layer of gravel 47 on top of the soil. At the outer peripheral edge, a slab of styrofoam 48 or the like is inserted beneath the sheet 46, with a plurality of heating pipes 49 embedded in the concrete 44. The first floor 11 slopes downwardly, as best indicated in FIG. 3, from its periphery toward the center of the house 10, and then has a gradual upward incline at the central section 11' until it reaches an apex at the centerpost.

Each partition 17 (FIG. 2) includes a quartet of radially spaced posts 51, 52, 53 and 54, all posts substantially equally spaced and on one radius. The innermost post 51 is mounted on the first floor 11 just inside a trough unit indicated generally at 55 (FIG. 3) for the first floor, with the next post 52 mounted just outside the trough unit 55. Posts 51–53 are of substantially identical height with the outer post 54 extended upwardly to engage and support a portion 56 of the roof 16.

The partition 17 also includes a plurality of fence sections 57, 58, 59, 60, 61, 62, and 63. All fence sections are substantially identical, each having end members 64 adapted for securement to bolts 66 secured to the posts. Referring to FIG. 3, it is noted that the fence section 60 is secured at its outer end to the wall 14. In each instance, a fence section is mounted with its lower edge 67 just above the surface of the floor to prevent the offspring from moving from one stall to another.

Referring to FIG. 2, it is seen that by arcuately and equally spacing each row of posts and fence sections which combine to form the stalls extended inwardly from the wall 14 and ending at a location radially spaced from the centerpost 22, all of the stalls are pie-shaped, radially extending and arcuately contiguous.

Specifically, the second floor 12 is divided into sections one for each stall, and which include in addition to the second floor trough unit indicated generally at 55 (FIG. 3), a pie-shaped panel 68 adapted to be bolted to a plurality of angle irons, only one 69 showing, secured to and extended between the three pairs of adjacent posts 52–54 each. Referring to FIGS. 2 and 3, it will be noted that the outer edge 71 of the panel 68 is spaced radially inwardly from the outer posts 54 to leave an opening 72 in the second, upper floor 12 at the rear end of each stall 18, etc.

This opening 72 is filled out with a grate 73 bolted to an angle iron 74 secured to the posts 54. The grate 73 fills the opening 72 sufficiently to prevent an animal from falling therethrough, but also leaves sufficient space to permit granular feed to pass therethrough from above the second floor 12 as illustrated in FIG. 3. To insure that the feed discharged from the feed equipment 21 above the upper floor 12 does pass downwardly through the grate 73, a panel 76 (FIG. 3) is secured in an upstanding manner between each pair of adjacent posts 54, which panel 76 extends from substantially the top edge 77 of the fence section 57 downwardly slightly below the grate 73. The panel 76 thereby acts to deflect and direct granular material downwardly through the grate 73 for a purpose described hereinafter.

Beyond the panel 76 is the catwalk assembly 23 mentioned hereinbefore. Similar to the other still elements which combine to form an entire individual stall capable of confining a sow and subsequently her offspring, the catwalk assembly 23 is made up of a plurality of U-shaped floor sections 78 (FIGS. 2 and 3). Each floor section 73 is trapezoidal in plan view as best illustrated in FIG. 2. A radially extended angle iron 79 is secured at opposite ends to the wall 14 and to the outer post 54 to provide support for adjacent ends of adjacent floor sections 78. The two outer corners of each catwalk floor section 78 are pivotally connected to a bracket unit 81 affixed to the wall 14 which enables each floor section 78 to be moved from a generally horizontal position as shown in full lines in FIG. 3 for supporting the operator, to a raised position as indicated by dotted lines whereby the operator may look into or enter the area therebelow.

Feed is supplied to the feed equipment 21 (FIG. 3) from external the feed housing 10 by an auger system 82 (FIG. 1) leading from a mix-mill housing 83, disposed beneath a pair of bulk feed tanks 84 and 86, upwardly over the roof line for discharge through a spout 87 into a funnel-type hopper unit 88 shown in dotted lines in FIG. 1. The hopper unit 88 is mounted on the centerpost 22 and supplies feed to a downwardly inclined auger feed conveyor 89 (FIG. 3) rotatably mounted at its inner end to the lower end of the hopper unit 88.

An auger 91 is mounted within the conveyor 89 for rotation by a motor 92 mounted on the outer end of the conveyor, via a pulley belt system. A reversible motor (not shown) is also mounted adjacent the motor 92 for rotating a wheel 93 affixed to the end of the conveyor 89 in opposite directions. As the wheel 93 rotates against a track 94 mounted about the posts 54, a friction drive is obtained upon rotating the wheel 93 for rotating the conveyor 89 about the centerpost 22. The normal rotation of the conveyor 89 is approximately 360° in one direction about the post 22, and then approximately 360° in the opposite direction, and so on. Referring to FIG. 3, it is seen that the radial length of the conveyor 89 is such that it extends completely the radial length of the upper floor 12.

A spout 96 is provided at the outer end of the conveyor 89 for discharging feed downwardly toward the second floor feed opening grate 73 for subsequent deposit on the first floor 11. To supply feed to the second floor 12, the conveyor 89 is provided with a slidable discharge unit 97 mounted inwardly of the spout 96 and controlled by a lever 98 adapted to be reached by the operator while on the catwalk assembly 23. The arrangement is such that manipulation of the lever 98 can selectively regulate both flows of feed both through the spout 96 and the discharge unit 97. Thus, selective and concurrent supply of feed to both floors is provided by the feed equipment. It is envisioned that the motors can be so controlled that automatic feeding of selected stalls is obtainable.

For providing fresh air to the interior of the feeding house 10, one or more air inlet scoops 99 (FIG. 1) are mounted on the roof 16. One or more exhaust fan housings 101 are secured to the wall 14 at openings (not shown) formed therein for exhausting air from the feeding house 10. The operation of these fan housings 101 may either be manual or automatic as desired.

Specifically as to the first floor trough unit 70, it comprises an annularly extending panel 102 both ends of which abut the passage 32 (FIG. 2), and the side edges of which extend contiguous to the inner row of posts 51 and to the next adjacent row of posts 52. A plurality of transversely extending, radially spaced beads 103 are formed on the upper surface of the panel such as to enable a footing for the swine which might walk thereon.

In transverse cross section, the first floor panel 102 has a slight V-shape depending inwardly and downwardly from the side edges toward the center 104 thereof which is the lowest portion. Fluid which therefore drops or runs onto the side or outer edges of the panel will run radially downwardly toward the center, lower portion 104 thereof. The panel 102 is supported on the concrete 44 by a mating depression 106 formed therein.

For providing a transverse or annular flow of fluid on the first floor panel 102 in a circular direction with respect to the house 10, one end 107 (FIG. 4) of the panel 102 is higher than the opposite or lower end 108, and with the panel 102 progressively descending or depending therebetween. Thus, fluid which drops onto the panel 102 or which flows thereon at the high end 107 will gradually flow downhill, so to speak, until it reaches the low end 108. At the latter end 108, the fluid is transmitted through a duct 109 into a septic tank 111.

The second floor trough unit 55 also comprises a panel 112 which is identical to the first floor panel 102. The upper floor panel 112 is supported between a pair of radially spaced angle irons 113 and 114 which are secured between adjacent pairs of posts 51, 51 and 52, 52. Similar to the first floor panel 102, the upper floor panel 112 has a high end 116 (FIG. 4) and descends progressively to a low end 117. Referring to FIG. 4, one method of disposing of the fluid at the low end 117 of the upper floor panel 112 is by fluidly connecting same by means of a pipe 118 to the high end 107 of the first floor panel 102. It can readily be seen, however, that a duct such as 109 could also be fluidly connected between the septic tank 111 and the low end 117 of the upper panel 112.

Referring to FIG. 5, a section 119 of the second floor panel 112 is shown in elevation, the illustration depicting in a somewhat exaggerated manner the progressive descending nature of the panel 112, the portion 119a being higher than the portion 119b of the panel section 119.

To particularly cleanse the upper floor 12 and both trough panels 112 and 102, a fluid supply arrangement is provided. This comprises a high pressure, submergible type pump 121 (FIG. 3), mounted by a bracket 122 to the centerpost 22, and fluidly connected by a line 123 to a supply of fluid, such as water. The arrangement also includes a flexible conduit 124 of a length which can be wrapped more than once about the centerpost 22, and which connects to the outer end of a more solid conduit 126. The conduit 126 extends substantially the full length of the feed conveyor 89 and is connected thereto by a plurality of radially spaced bands 127. A hand operated valve 128 is provided at the outer end of the conduit 126 for manual manipulation by the operator, which valve 128 is operated internally the conduit 126 to vary the size of openings (not shown) in the conduit 126 leading to a pair of sprinkling nozzles 129 and 131 fluidly connected in a radially spaced manner to the conduit 126.

As best illustrated in FIG. 3, the discharge of fluid through the nozzles 129 and 131, via the conduit 126 and also controlled by the valve 128 provides for directing a diverging stream or spray of water onto both the inner panel 68 of the upper floor and the inside trough panel 112 also of the second floor 12. This discharge of water results in the water striking and flowing radially downwardly of both panels 68 and 112, with the cleansing water collecting in the trough panel 112 and being turned in direction about 90°, wherein the cleaning water then runs circumferentially thereabout for subsequent discharge as described hereinbefore. Furthermore, due to the V-shaped nature of the panel 112, and also the panel 102, the water therein constantly converges upon itself such that the majority of the water runs within the lower portion 104 of the panels, having therefore a stream narrower, and faster, than the stream of water initially forming the circumferential stream.

The arrangement includes additionally a pipe 132 (FIG. 3) connected to the conduit 126 and depending closely adjacent the front gates 36 of the upper stalls such as to be movable about the service area 27, passing between the ramp 28 and the gates 36.

A pair of sprinkling nozzles 133 and 134 are fluidly connected to the pipe 132 in vertically spaced relation and are directed toward the upper and lower trough panels 112 and 102, respectively, such as to discharge a spray of water thereon. It will be noted that the discharge spray from the nozzles 133 and 134 also strikes the watering devices 38 such as to aid in flushing and cleansing these devices 38 in addition to the trough panels 112 and 102.

A switch 136 (FIG. 3) is mounted on the outer end of the feed conveyor 89 for controlling the operation of the pump 121, such that a normal amount of pressure, for example from 30–50 lbs/sq. in. of the fluid used for cleansing purposes can be raised to a higher pressure of 110–130 lbs/sq. in., for example. The switch is electrically connected by conventional means (not shown) to the pump 121 for accomplishing this result, and is manually operable by the operator standing on the catwalk assembly 23. It is also envisionable that the switch 136 can be electrically connected to the motors hereinbefore described, on the outer end of the feed conveyor 89 for controlling the rotation of the feed conveyor 89 about the centerpost 22 for discharging water through the nozzles 129, 131, 133 and 134 either in conjunction with the feeding operation through the feed conveyor 89, or independent thereof.

An auxiliary cleansing arrangement is provided for the floor surface of the first floor 11 by means of a conduit 137 (FIG. 3) in fluid communication with the upright pipe 41 and an annular pipe 138 which is suspended about the first floor as best illustrated in FIG. 2, the pipe 138 being connected directly to the bottom of the upper floor 12 by a plurality of brackets 139. A nozzle 141 is connected to the pipe 138 within each stall 19, etc. on the first floor for discharging a stream or spray of water directly downwardly onto the surface of the first floor 11 as illustrated in FIG. 3.

It is seen by this arrangement that cleansing water is automatically discharged onto the uppermost floor and onto both trough panels of both floors for providing a cleansing of the uppermost floor surface and of the trough panel surfaces of animal wastes, with the wastes being removed automatically by the very water which is used for cleaning purposes due to the progressive descending nature of the trough and for fluid communication with the septic tank. Furthermore, the inherent nature of the trough provides a constantly converging and narrowing stream of the water which enhances its cleansing capability. The cleansing of these areas of the animal wastes also provides for the air within the house 10 being more fresh, and tends to obviate the occurring of methane or ammonia fumes, in addition to the growth of anaerobic bacteria which occurs in exposed standing animal wastes, plus eliminating anaerobic bacteria which occurs on the wastes below the surface of the liquid.

Although a preferred embodiment of this invention has been disclosed herein, it is to be remembered that various modifications and alternate constructions can be made thereto without departing from the invention as defined in the appended claims.

I claim:
1. In a farm animal feeding house having a plurality of superimposed floors each sloped downwardly from an outer boundary toward a common center, a plurality of arcuately spaced stalls supported on each floor and arranged concentrically about the center of the respective floor, and a feed discharge conveyor supported above and extending over the uppermost of the floors, the conveyor arcuately movable about the center of the floors, the improvement comprising:
   annular sanitation trough means formed about each floor and disposed between the outer boundary and the center of each floor, said trough means disposed within all of said stalls and progressively descending from one end to the other end thereof;
   means connected to the feed discharge conveyor for discharging fluid therefrom, over said trough means formed about each floor to run toward the said other end thereof; and
   means at said other end for removing the fluid received thereat from said trough means.

2. In a farm animal feeding house as described in claim 1, the improvement comprising further said trough means including a pan for supporting farm animals thereon, said pan in transverse cross section depending inwardly and downwardly from the side edges toward the center thereof and having thereby a substantially flat V-shape such that fluid on said pan flows inwardly from said side edges toward said center thereof.

3. In a farm animal feeding house as defined in claim 1, the improvement comprising further said fluid discharge means including one or more sprinkling nozzles disposed directly above the uppermost floor and said trough means therefor.

4. In a farm animal feeding house as defined in claim 3, the improvement comprising further a plurality of sprinkling nozzles spaced radially on the conveyor, with at least one of said nozzles disposed directly above the uppermost floor, and another of said nozzles disposed directly above said trough means therefor.

5. In a farm animal feeding house as defined in claim 1, the improvement comprising further said fluid removing means including a conduit fluidly connected between the low end of each trough means and the high end of the next adjacent trough means therebelow for transmitting the fluid from each trough means to the next trough means therebelow such that a continuous flow of fluid over the entire upper surface of each trough means is obtained.

6. In a farm animal feeding house as defined in claim 1, the improvement comprising further means connected to the feed discharge conveyor for discharging feed simultaneously onto each trough means formed about each floor.

7. In a farm animal feeding house as defined in claim 1, the improvement comprising further means mounted below each floor above the ground floor of said house for discharging fluid onto the surface of the floor therebelow.

8. In a farm animal feeding house as defined in claim 3, the improvement comprising further means connected to the feed discharge conveyor for discharging feed simultaneously onto each trough means formed about each floor.

9. In a farm animal feeding house as defined in claim 8, the improvement comprising further means mounted below each floor above the ground floor of said house for discharging fluid onto the surface of the floor therebelow.

10. A method of cleaning the floors of a farm animal feeding house having a plurality of superimposed floors comprising the following steps:
   moving a source of water across a floor;
   discharging water from said source downwardly onto each floor;
   running the discharged water over the floor downwardly toward the central area of the floor;
   turning the running water approximately 90° degrees at the central area and running the water over the floor circumferentially about the central area; and
   withdrawing the turned water from off the floor and directing it into a holding tank for eventual purification.

11. A method of cleaning the floors of a farm animal feeding house as defined in claim 10, and further wherein the discharged water running over the floor downwardly toward the central area thereof is running substantially radially of the center of the floor.

12. A method of cleaning the floors of a farm animal feeding house as defined in claim 10, and further wherein the turned water runs not only circumferentially but also constantly converges upon itself such that the majority of said circumferentially running water has a stream narrower than the width of the stream initially forming the circumferential stream.

13. A method of cleaning the floors of a farm animal feeding house as defined in claim 10, and further wherein the running water is withdrawn only after it has traversed substantially the entire circumference of the central area of the floor.

14. A method of cleaning the floors of a farm animal feeding house having a plurality of superimposed floors comprising the following steps:
   a first step of discharging water downwardly from a moving source onto the uppermost floor;
   a second step of running the discharged water over the uppermost floor downwardly toward the central area thereof;
   a third step of turning the running water approximately 90° at the central area and running the water over the floor circumferentially about the central area thereof;
   a fourth step of withdrawing the turned water from off the uppermost floor and discharging it onto the next floor immediately below the uppermost floor;
   a fifth step of running the withdrawn water over the said next floor circumferentially about the central area thereof;
   repeating the fourth and fifth steps in succession for all floors; and
   withdrawing the circumferentially running water from off the lowermost floor and directing it into a holding tank for eventual purification of the cleaning water.